July 4, 1961

E. A. BROWN 2,991,455

MAGNETIC CORE LOGICAL DEVICES

Filed Aug. 25, 1955

2 Sheets-Sheet 1

INVENTOR.
EDGAR A. BROWN

BY Paul M. Brannen

AGENT

July 4, 1961

E. A. BROWN 2,991,455

MAGNETIC CORE LOGICAL DEVICES

Filed Aug. 25, 1955

2 Sheets-Sheet 2

United States Patent Office 2,991,455

Patented July 4, 1961

2,991,455

MAGNETIC CORE LOGICAL DEVICES

Edgar A. Brown, Owego, N.Y., assignor to International Business Machines Corporation, New York, N.Y., a corporation of New York Filed Aug. 25, 1955, Ser. No. 530,524
10 Claims. (Cl. 340—174)

This invention relates to logical devices employing magnetic cores, and particularly to improved logical devices in which a single magnetic core may be utilized to perform logical operations.

The invention disclosed and claimed herein is an improvement over the invention disclosed and claimed in a co-pending application Serial No. 383,568, filed on October 1, 1953, on behalf of Edgar A. Brown, for Non-Destructive Sensing of Magnetic Cores, now U.S. Patent No. 2,902,676, granted September 1, 1959.

It has been previously proposed to provide logical devices employing combinations of two-valued or binary devices such as bistable magnetic cores, relays, thermionic tubes, and asymmetric diodes or rectifiers, combined in such manner that for particular combinations of input conditions, unique output conditions result.

It has also been previously proposed to provide magnetic core devices in which the operation is dependent upon the coincident application of two magnetizing forces, in which the operating currents must be carefully regulated if proper operation is to be insured.

It is an object of this invention to provide a novel form of magnetic core logical device not subject to the operating limitations imposed on previous core structures.

Another object of this invention is to provide improved logical devices utilizing a core structure including means for producing an auxiliary flux in the core.

A further object of this invention is to provide a novel magnetic core structure which may be employed as a logical device.

Yet another object of this invention is to provide a pulse transfer controlling device capable of performing logical functions.

In practicing the invention, there is provided a magnetic core in which subdivided cross-sectional areas of the core are formed by any suitable method, such as, for example, by drilling or otherwise forming one or more holes through the core. In addition to the principal flux which circulates in the core, auxiliary fluxes are set up through the subdivided areas of the core by means of suitable windings which are wound around the subdivided core portions, for example, by threading one or more windings through one or more holes in the core. The parts are proportioned and arranged so that in the case of a logical AND device, coexisting signals must be supplied to the windings which link the auxiliary flux paths to produce a usable output signal and in the case of a logical OR device, a signal must be supplied to at least one of the windings which link the auxiliary flux paths to produce a usable output signal.

Other objects of the invention will be pointed out in the following description and claims and illustrated in the accompanying drawings, which disclose, by way of example, the principle of the invention and the best mode which has been contemplated of applying that principle.

Figure 1:
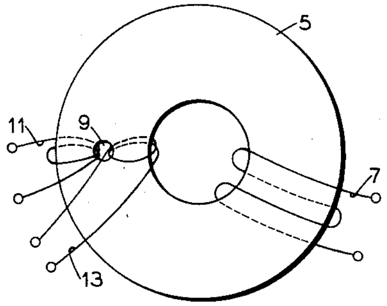
FIG. 1 is a diagrammatic view of one form of the invention wherein a magnetic core is utilized in a logical AND device responsive only to coexisting input signals.

FIGS. 4*a*, 4*b*, 5, 6*a* and 6*b* are diagrammatic illustrations of the flux patterns occurring in the cores under various operating conditions.

Similar reference characters refer to similar parts in each of the several views.

Referring to FIG. 1, there is shown a magnetic core 5 provided with three separate windings. Winding 7 is an output winding wound about the toroidal-type core in the conventional manner. A hole 9 is drilled or otherwise formed through the core in such manner that the cross-sectional area of the core at the location of the hole is divided into two substantially equal areas. A first input winding 11 is threaded through the hole and about the core in such manner as to form an input winding linked with a first half of the two half-core sections, and a second input winding 13 is threaded through hole 9 and about the core in such manner as to form an input winding linked with the second half of the two half-core sections. The hole 9 is shown as being drilled in the axial direction of the toroidal core, but it may readily be drilled in a radial direction, or at any other angle. Additionally, it should be noted that the invention contemplates the use of magnetic cores having configurations other than the toroidal-shaped core as shown.

In operation, the input windings 11 and 13 may be pulsed by current of predetermined magnitude and of one polarity or the other to cause the core to exist in one or the other of its two remanent states, that is, with the remanent flux existing in a relative positive or negative state. However, the remanent state of core 5 can be changed only by concurrent energization of both input windings, by current of similar relative polarity. The energization of either winding 11 or winding 13 singly, or the energization of the two windings simultaneously by current of opposite relative polarities will not be effective to change the state of the core, even though the current magnitude in the input windings may exceed the value required to switch the core when both input windings are properly pulsed.

The polarization, i.e., the direction of current flow in the input windings, must be in the same direction and in the sense that will set the core in the desired remanent flux state.

It is to be noted that the requirement for achieving an AND input effective to switch the core is met by coexisting signals having the proper polarity in the input windings 11 and 13. Thus, in addition to simultaneous pulsing of the input windings, one of the windings may, for example, be continuously energized, in which case the core is switched when a signal is supplied to the other winding. Direct current, interrupted direct current, or alternating current may be supplied to the input windings if desired, since as previously pointed out, a usable output is provided by the output winding 7 when coexisting signals having the proper polarity are supplied to the input windings.

Since switching of the core can occur only upon proper coincident pulsing of the input windings, it follows that the arrangement disclosed in FIG. 1 meets the requirements for a logical AND device. The advantages of such an arrangement include economy of fabrication and small space requirements, in comparison with AND devices employing electronic or asymmetric devices. Also, no energy is required to maintain the core in one or the other of its two states, and the heater energy required in AND devices employing vacuum tubes is eliminated.

Figure 2:
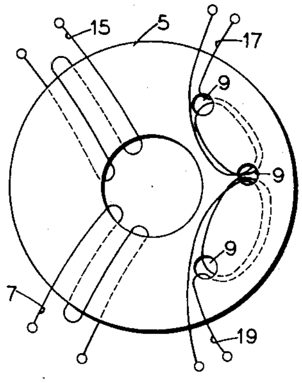
FIG. 2 is a diagrammatic view of another form of the invention wherein a magnetic core is utilized in a logical AND device responsive only to coexisting sampling signals.

Referring now to FIG. 2, there is shown another modification of the invention, in which the state of the magnetic core, as produced by suitable energy supplied to an input winding, is sensed by a pair of sensing or sample windings, which must both be energized by energy of proper polarity in order to provide an output indicative of the remanent state of the core. The parts are constructed and arranged so that the sample windings may be repetitively pulsed to determine the remanent flux state of the core without changing this state.

As shown, the core 5 is provided with a conventional input winding 15 and a conventional output winding 7. Additionally, a first sampling or sensing winding 17 and a second sampling or sensing winding 19 are provided, which windings are threaded through holes 9 in the core in the manner shown in the drawings so that the auxiliary fluxes set up by the sensing windings flow in adjacent paths. The input winding 15 is pulsed in the usual manner to place the core 5 in one or the other of its two remanent states. Thereafter, the sense of the flux in the core 5 may be determined by energizing the windings 17 and 19 by current having the same relative polarity. An output pulse is induced in the output winding 7 as a result of the coincident pulsing of the sample windings 17 and 19. Pulsing of only one of the two sample windings will produce an output pulse in the output winding, but the magnitude of such an output pulse will be considerably less than the magnitude of output pulses produced when both sample windings are pulsed simultaneously.

With the core 5 having been placed in one of its two remanent states by suitable pulsing of the input winding 15, the sample windings 17 and 19 may be repetitively pulsed to produce an output pulse indicative of the sense of the core flux, without changing the sense. It can thus be seen that a magnetic core circuit arranged as shown in FIG. 2 will function as a logical AND device.

The windings 17 and 19 may be energized by current of either polarity or by alternating current. Moreover, one of the windings may be energized continuously, and the other winding pulsed, when it is desired to produce an output signal. The principal requirement to be met is that both windings must be energized in order to produce a usable output signal.

Figure 3:
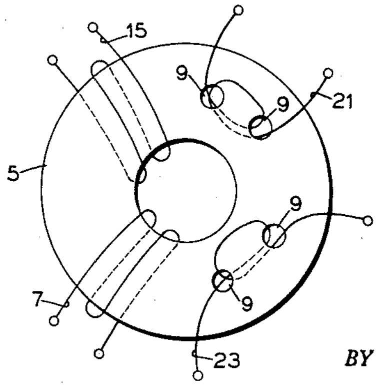
FIG. 3 is a diagrammatic view of still another form of the invention wherein a magnetic core is utilized in a logical OR device responsive to sampling signals supplied to one or another of a plurality of sample windings.

Referring now to FIG. 3, there is shown an arrangement which may be utilized as a logical OR device, that is, a circuit which provides an output when one of at least two sampling windings is energized, to thereby produce an output signal indicative of the remanent state of the core. The core 5 is provided with a conventional input winding 15 and a conventional output winding 7. A first sample winding 21 is wound through a pair of spaced holes 9 in the core, and a second sample winding is wound through another pair of holes 9 in the core, the first and second sampling windings being spaced sufficiently far apart to reduce crosstalk between the sample windings.

With the core 5 placed in one or the other of its remanent states by an input pulse supplied to winding 15, an output pulse indicative of the flux sense in the core is produced by pulsing either of the sample windings 21 or 23. As pointed out above, the sample windings 21 and 23 are spaced sufficiently far apart that the crosstalk or coupling between the sampling windings is relatively small compared with the magnitude of the sampling pulses supplied to the windings and compared with the magnitude of the output pulses.

Although only two sample windings are shown in FIG. 3, it is to be understood that any number of sample windings may be employed properly spaced around the core. Also it should be noted that the disclosed embodiment is effective to provide an output when any one of a plurality of sample windings is energized, whether or not any other sample windings are energized at that time.

Figure 4A:
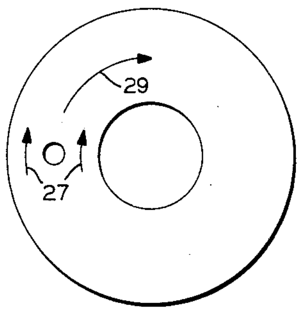
Figure 4B:
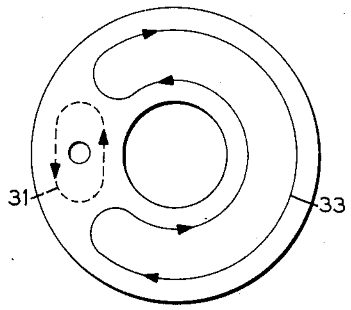

FIGS. 4*a* and 4*b* illustrate the flux paths encountered in the core shown in FIG. 1. In FIGS 4*a*, 4*b*, 5, 6*a* and 6*b*, the windings have not been shown, for the sake of clarity. FIG. 4*a* shows the flux paths occurring when both of the input windings are simultaneously energized, to product flux of the same relative polarity in both of the parallel portions of the core, as indicated by arrows 27, which add to provide the principal flux indicated by arrow 29. Such flux is effective to switch the core, as previously explained.

In FIG. 4*b*, the fluxes produced by the input windings have opposite relative polarity, so that these fluxes circulate in a localized path designated by the broken line 31. The remanent flux in the core assumes a kidney-like shape, as indicated by the loop 33. It is apparent that when the input windings are de-energized, the remanent flux will assume its previous condition, that is it will not be reversed from the state it occupied before the windings were oppositely energized.

Figure 5:
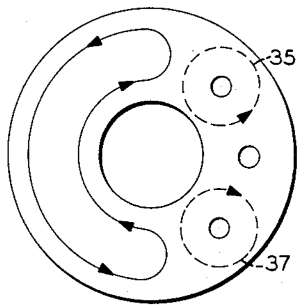

FIG. 5 illustrates the flux paths produced in the arrangement shown in FIG. 2 when the two sampling windings are concurrently energized. Each winding sets up sampling flux, as indicated by the broken lines 35 and 37. The saturation of the core in these areas causes the remanent flux to "kidney" as shown, producing an output in the output winding, but not changing polarity when the sampling fluxes disappear.

Figure 6A:
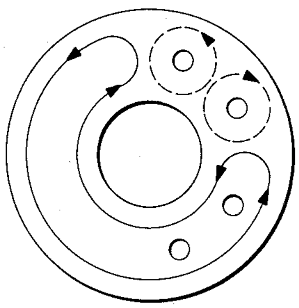
Figure 6B:
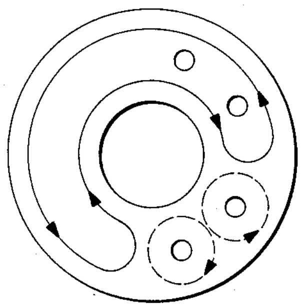

FIGS. 6*a* and 6*b* illustrate the operation of the arrangement shown in FIG. 3, FIG. 6*a* being illustrative of a sampling operation using sampling winding 21 of FIG. 3, and FIG. 6*b* being illustrative of a sampling operation using winding 23 of FIG. 3. In each case, energization of the sampling winding causes the remanent flux to "kidney" and produce an output signal, but the relative polarity remains unchanged after the sampling flux is removed.

It can be seen that in accordance with this invention novel logical devices can be provided presenting an advantageous economy in fabrication cost and space requirements. Since no external energy is required to maintain the cores in their stable states, the power requirements for apparatus employing these circuits are considerably reduced. Another advantage of the arrangement disclosed in FIG. 1 is that false operation cannot occur as a result of variations in the current supplied to either of the input windings when energized singly. A further advantage resides in the fact that the energization of the sampling windings of FIGS. 2 and 3 does not change the sense of the flux, so that the cores may be repetitively sensed without loss of the stored information.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A magnetic core logical device comprising a magnetic circuit capable of assuming a first or a second remanent flux state and having a portion thereof divided into at least a first and a second auxiliary flux path, said auxiliary flux paths being adjacent and parallel, a first and a second winding inductively coupled to said first and second auxiliary flux paths respectively, each of said windings having separate terminals and adapted to be individually energized or de-energized in accordance with input conditions, and an output winding inductively coupled to said magnetic circuit in which a voltage is induced by variations of flux in said first and second auxiliary flux paths.

2. A magnetic core logical device comprising a magnetic circuit capable of assuming a first or a second remanent flux state and having a portion thereof divided into two adjacent and parallel auxiliary flux paths, a winding for each of said flux paths inductively coupled thereto for creating flux therein when the associated winding is energized, each of said windings having separate terminals and adapted to be individually energized or de-energized in accordance with input conditions, and an output winding inductively coupled to said magnetic circuit in which a voltage is induced by variations of flux in said auxiliary flux paths.

3. A magnetic core logical device comprising a magnetic circuit capable of assuming a first or a second remanent flux state and having a portion thereof divided into at least two auxiliary adjacent and parallel flux paths, externally energized winding means for each of said auxiliary flux paths for producing flux in the associated circuit auxiliary flux path, and means inductively coupled to said magnetic circuit responsive to variations of flux in said magnetic circuit.

4. A magnetic core logical device comprising a magnetic circuit capable of assuming a first or a second remanent flux state and having a portion thereof divided into at least two auxiliary adjacent and parallel flux paths, externally energized winding means for each of said auxiliary flux paths for producing flux in the associated auxiliary flux path in accordance with separate input conditions and means inductively coupled to said magnetic circuit which is responsive to variations of flux in said magnetic circuit, said variations in flux being indicative of the time relationship of said input conditions.

5. A magnetic core logical device comprising a magnetic circuit capable of assuming a first or a second remanent flux state and having a portion thereof divided into two auxiliary adjacent and parallel flux paths, an input winding for each of said auxiliary flux paths inductively coupled thereto and effective when energized to create flux in the associated auxiliary flux path, and an output winding inductively linking said magnetic circuit, the parts being proportioned and arranged so that the voltage induced in said output winding by the change of flux in said magnetic circuit exceeds a predetermined value when and only when both of said input windings are energized.

6. A magnetic core logical device comprising a magnetic core having a first and a second stable state of remanent flux, said core having a portion divided into first and second adjacent and parallel flux paths, a first and a second input winding inductively linked with said first and second parallel flux paths respectively and effective when concurrently energized with energy of the same relative polarity to establish said core in one or the other of said two stable states, and an output winding inductively linked with said core to have voltages induced therein in response to changes in flux in said core.

7. A magnetic core logical device comprising a closed loop of magnetic material, said material having two stable states of remanent flux, an opening positioned through said loop at substantially the center line of the loop to divide a portion of said loop into two substantially equal portions, a first winding passing through said opening and inductively linking one of said portions, a second winding passing through said opening and inductively linking the other of said portions, and an output winding linking said loop.

8. A magnetic core logical device comprising a closed magnetic circuit capable of assuming a first or a second remanent flux state, an input winding inductively linked with said circuit, an output winding inductively linked with said circuit, a first, a second, and a third opening positioned through said core equidistantly along the center line thereof in the order named, a first sampling winding wound through said first and said second openings and a second sampling winding wound through said second and said third openings.

9. A magnetic core logical device comprising a closed magnetic circuit capable of assuming a first or a second remanent flux state, an input winding inductively coupled to said circuit, an output winding inductively coupled to said circuit, at least two pairs of openings positioned through said magnetic circuit, each pair of said openings dividing the magnetic circuit into two parallel flux paths, and a sampling winding for each pair of openings, said sampling windings being wound through said openings to create auxiliary flux in said parallel paths when said sampling windings are energized.

10. A magnetic core logical device comprising a core of magnetic material having two stable states of remanent flux, an input winding inductively coupled to said core and effective when energized to establish said core in one or the other of said two stable states, an ouput winding inductively coupled to said core, at least two pairs of spaced parallel openings through said core located on the center line of said core, a sensing winding for each pair of openings wound therethrough, said pair of openings being spaced from each other by a distance at least as great as the distance between the openings comprising a pair.

References Cited in the file of this patent

UNITED STATES PATENTS

| | | |
|---|---|---|
| 2,284,406 | D'Entremont | May 26, 1942 |
| 2,430,457 | Dimond | Nov. 11, 1947 |
| 2,519,426 | Grant | Aug. 22, 1950 |
| 2,689,328 | Logan | Sept. 14, 1954 |
| 2,700,703 | Nordyke | Jan. 25, 1955 |
| 2,741,757 | Devol et al. | Apr. 10, 1956 |
| 2,742,632 | Whitely | Apr. 17, 1956 |
| 2,745,908 | Cohen | May 15, 1956 |
| 2,803,812 | Rajchman et al. | Aug. 20, 1957 |

OTHER REFERENCES

"Magnetic Switching Circuits," by R. C. Minnick, published April 1954, "Journal of Applied Physics," vol. 25, No. 4, pp. 479–485.

UNITED STATES PATENT OFFICE

CERTIFICATE OF CORRECTION

Patent No. 2,991,455 July 4, 1961

Edgar A. Brown

It is hereby certified that error appears in the above numbered patent requiring correction and that the said Letters Patent should read as corrected below.

Column 4, line 3, for "product" read -- produce --; column 5, line 13, strike out "circuit".

Signed and sealed this 5th day of December 1961.

(SEAL)
Attest:

ERNEST W. SWIDER
Attesting Officer

DAVID L. LADD
Commissioner of Patents

USCOMM-DC